US012663054B1

(12) United States Patent

Nazir et al.

(10) Patent No.: US 12,663,054 B1

(45) Date of Patent: Jun. 23, 2026

(54) MULTI-DIRECTIONAL LOAD DISSIPATION USING MULTIMATERIAL MECHANICAL METAMATERIALS

(71) Applicant: KING FAHD UNIVERSITY OF PETROLEUM AND MINERALS, Dhahran (SA)

(72) Inventors: Aamer Nazir, Dhahran (SA); Kashif Azher, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/390,233

(22) Filed: Nov. 14, 2025

(30) Foreign Application Priority Data

Nov. 10, 2025 (SA) ................................. 1020258337

(51) Int. Cl.
| | |
|---|---|
| *F16F 7/12* | (2006.01) |
| *B32B 3/26* | (2006.01) |
| *B33Y 80/00* | (2015.01) |

(52) U.S. Cl.
CPC ................ *F16F 7/121* (2013.01); *B32B 3/26* (2013.01); *B33Y 80/00* (2014.12)

(58) Field of Classification Search
CPC .... F16F 7/12; F16F 7/121; F16F 7/128; F16F 1/3615; F16F 1/366; F16F 1/373;
(Continued)

(56) References Cited

U.S. PATENT DOCUMENTS

| | | | | |
|---|---|---|---|---|
| 1,153,058 A | * | 9/1915 | Gilfillan ................. | B60G 11/02 |
| | | | | 267/42 |
| 4,736,932 A | * | 4/1988 | Haslim ................. | B62D 5/083 |
| | | | | 5/247 |

(Continued)

FOREIGN PATENT DOCUMENTS

| | | |
|---|---|---|
| CN | 116733880 A | 9/2023 |
| ES | 290751482 | 11/2022 |

OTHER PUBLICATIONS

Da Chen, et al., "Multi-material additive manufacturing of metamaterials with giant, tallorable negative Poisson's ratios", Scientific Reports, vol. 8, Article 9139, 2016, 8 Pages.

*Primary Examiner* — Bradley T King

(74) *Attorney, Agent, or Firm* — Oblon, McClelland, Maier & Neustadt, L.L.P.

(57) ABSTRACT

A multimaterial mechanical metamaterial (MMM) system for multi-directional load dissipation includes a rigid structural framework made of a first material, including left, right, and middle structures. This framework houses elastic bars made of a second, more elastic material. Upon application of a compressive load, the geometry of the rigid framework causes horizontal bars to stretch, dissipating a first portion of the load in an orthogonal direction. As deformation increases, the framework engages the middle structure, causing a vertical bar to stretch and dissipate a second portion of the load in a direction opposite to the initial applied load. A method for using the MMM system for protection against compressive loads provides a sequential, two-stage mechanism for energy absorption and force redirection. The method includes placing the MMM system between a subject and a compressive load.

20 Claims, 6 Drawing Sheets

(58) Field of Classification Search
CPC ........ F16F 2228/007; B32B 3/12; B32B 3/26;
B29C 64/10; B29C 64/118; B33Y 80/00;
B33Y 70/00; B33Y 70/10
See application file for complete search history.

(56) References Cited

U.S. PATENT DOCUMENTS

| | | | |
|---|---|---|---|
| 7,678,440 B1 * | 3/2010 | McKnight ................. | B32B 3/26 |
| | | | 148/563 |
| 10,751,970 B2 * | 8/2020 | Yeh ...................... | B22F 3/1115 |
| 11,820,266 B2 * | 11/2023 | Brown ................. | B60N 2/7094 |
| 2005/0287371 A1 * | 12/2005 | Chaudhari .............. | B60R 19/18 |
| | | | 428/480 |
| 2012/0315456 A1 * | 12/2012 | Scarpa ...................... | B32B 3/12 |
| | | | 428/221 |
| 2014/0205795 A1 * | 7/2014 | Hu .......................... | B32B 5/028 |
| | | | 28/165 |
| 2017/0009036 A1 * | 1/2017 | Xie ......................... | B33Y 80/00 |
| 2017/0058985 A1 | 3/2017 | Martino Gonzalez et al. | |
| 2017/0231322 A1 * | 8/2017 | Gheorghian ......... | A43B 13/182 |
| | | | 267/141 |
| 2018/0237965 A1 * | 8/2018 | Li ........................... | F16C 11/12 |
| 2019/0093728 A1 * | 3/2019 | Yang ....................... | F16F 1/373 |
| 2021/0316501 A1 * | 10/2021 | Boyce ................... | B22F 3/1115 |
| 2022/0332081 A1 * | 10/2022 | Shankar ................... | B32B 27/06 |
| 2022/0381311 A1 * | 12/2022 | Jeng ....................... | F16F 1/373 |
| 2023/0052509 A1 * | 2/2023 | Wang ...................... | B32B 37/00 |
| 2023/0398729 A1 | 12/2023 | Mueller et al. | |
| 2023/0400085 A1 * | 12/2023 | Almheiri ................ | F16F 15/04 |
| 2025/0297625 A1 * | 9/2025 | Demoly .............. | A63H 33/042 |

* cited by examiner

Placing the MMM system between a subject and the compressive load

FIG. 5

MULTI-DIRECTIONAL LOAD DISSIPATION USING MULTIMATERIAL MECHANICAL METAMATERIALS

CROSS REFERENCE TO RELATED APPLICATION

The present disclosure claims the benefit of Saudi Patent Application No. 1020258337, filed on Nov. 10, 2025 with the Saudi Authority for Intellectual Property Office, which is incorporated herein by reference in its entirety.

BACKGROUND

Technical Field

The present disclosure is directed to mechanical metamaterials for energy dissipation applications, and more particularly to multimaterial mechanical metamaterial systems configured to dissipate an applied load in multiple directions through selective deformation of elastic and rigid material components.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Recent developments in mechanical metamaterials have focused on structures designed to exhibit unique mechanical properties through geometric configuration rather than material composition alone. Conventional mechanical metamaterials typically employ single-material construction to achieve desired deformation characteristics under applied loads. These structures often rely on geometric patterns such as honeycomb configurations, lattice arrangements, or auxetic designs to modify how forces are transmitted through the material structure. Traditional approaches to mechanical metamaterial design have emphasized achieving specific mechanical properties such as negative Poisson ratios, enhanced stiffness-to-weight ratios, or controlled buckling behaviors through careful geometric optimization of unit cell structures.

Various problems exist with conventional single-material mechanical metamaterial approaches for load dissipation applications. Single-material structures are limited in their ability to selectively direct applied forces in multiple directions simultaneously. Conventional mechanical metamaterials typically respond to compressive loads by deforming primarily in the direction of the applied load or by exhibiting uniform expansion or contraction in perpendicular directions. These limitations restrict the effectiveness of conventional structures in applications requiring multidirectional load dissipation, energy absorption, or force redirection capabilities. Additionally, single-material approaches often require complex geometric configurations to achieve desired mechanical responses, which can compromise structural integrity or manufacturing feasibility.

Known approaches to addressing these limitations have included the development of multimaterial structures that combine materials with different mechanical properties within a single metamaterial system.

CN116733880A describes a structure of a honeycomb with auxetic behavior, having a negative Poisson ratio. The design is focused on achieving specific Poisson's ratio effects and buckling stability within the honeycomb structure.

US20230398729A1 describes a multimaterial lattice structure having interconnected struts, wherein the lattice structure includes an active material and a passive material. The modulus of the active material exhibits a shift upon exposure to a stimulus, causing the active material to soften or stiffen more than the passive material when exposed to the stimulus.

ES2907514B2 describes a metamaterial unit cell including a first group of nodes arranged on a central horizontal plane that define the interior vertices of a star, and a second group of nodes that define the outer vertices of the star. The structure is designed to create metamaterials with gradients in mechanical properties.

Each of the aforementioned references suffers from one or more drawbacks hindering their adoption in multidirectional load dissipation applications. Known multimaterial approaches typically focus on achieving specific mechanical properties such as negative Poisson ratios or stimulus-responsive behavior, rather than providing controlled multidirectional force dissipation. Conventional structures often require complex manufacturing processes or specialized materials that limit their practical implementation. Additionally, existing approaches do not provide the capability to simultaneously dissipate an applied load in orthogonal directions while reversing a portion of the applied load in an opposite direction to the applied load. The geometric configurations disclosed in conventional references do not enable the selective engagement of different material components to achieve progressive load dissipation as compression increases.

Accordingly, it is one object of the present disclosure to provide a multimaterial mechanical metamaterial system that addresses the limitations of conventional approaches by providing controlled multidirectional load dissipation through strategic placement of elastic and rigid materials within a geometric configuration that enables simultaneous orthogonal force dissipation and load reversal functionality.

SUMMARY

In an exemplary embodiment, a multimaterial mechanical metamaterial (MMM) system includes a top surface positioned at a top side of the MMM system, a bottom surface positioned at a bottom side of the MMM system, a left structure positioned at a left side of the MMM system and including four left lateral faces defining a left open-ended prism shape, a right structure positioned at a right side of the MMM system and including four right lateral faces defining a right open-ended prism shape, a middle structure positioned between the left structure and the right structure and including four middle lateral faces defining a middle open-ended prism shape, a left bar extending between a left edge and a right edge of the left open-ended prism shape of the left structure, a right bar extending between a left edge and a right edge of the right open-ended prism shape of the right structure, and a middle bar extending between a top edge and a bottom edge of the middle open-ended prism shape of the middle structure, wherein the top surface, the bottom surface, the left structure, the right structure and the middle structure include a first material, and the left bar, the right bar and the middle bar include a second material that is more elastic than the first material, wherein upon a compressive load on the MMM system, the left bar and the right bar are configured to dissipate a first portion of the compressive load to an orthogonal direction of the compressive load, and the middle bar is configured to reverse a second portion of the compressive load in an opposite direction of the compressive load.

In some embodiments, when no compression or stretching force is applied on the MMM system, the top surface, the bottom surface, the left bar and the right bar are parallel to one another and perpendicular to the middle bar.

In some embodiments, when no compression or stretching force is applied on the MMM system, the left structure is in direct contact with the top surface and the bottom surface, the right structure is in direct contact with the top surface and the bottom surface, the middle structure is spaced apart from the top surface and the bottom surface, and the middle structure is in direct contact with the left structure and the right structure.

In some embodiments, when no compression or stretching force is applied on the MMM system, in a cross section perpendicular to both the middle bar and the top surface, the left structure has a diamond shape, the right structure has a diamond shape, and the middle structure has a square shape.

In some embodiments, when no compression or stretching force is applied on the MMM system, in the cross section, a top edge of the left structure is in direct contact with a left end of the top surface, a bottom edge of the left structure is in direct contact with a left end of the bottom surface, a top edge of the right structure is in direct contact with a right end of the top surface, a bottom edge of the right structure is in direct contact with a right end of the bottom surface, a left edge of the middle structure is in direct contact with a right edge of the left structure, and a right edge of the middle structure is in direct contact with a left edge of the right structure.

In some embodiments, when no compression or stretching force is applied on the MMM system, in the cross section, the top edge, the bottom edge, a left edge and the right edge of the left structure and the top edge, the bottom edge, the left edge and a right edge of the right structure includes fillet ends that are curved.

In some embodiments, when no compression or stretching force is applied on the MMM system, in the cross section, a top edge of the middle bar is spaced apart from the top surface by a first distance, and a bottom edge of the middle bar is spaced apart from the bottom surface by a second distance that is equal to the first distance.

In some embodiments, the first material is less elastic than the second material.

In some embodiments, the first material is polylactic acid (PLA), and the second material is thermoplastic polyurethane (TPU).

In some embodiments, the top surface, the bottom surface, the left structure, the right structure and the middle structure together form one monolithic piece.

In some embodiments, the top surface, the bottom surface, the left structure, the right structure and the middle structure consist of the first material.

In some embodiments, the left bar, the right bar and the middle bar consist of the second material.

In some embodiments, when a compression force is applied on the MMM system along a first direction perpendicular to the top surface, the left structure compresses along the first direction and extends along a second direction that is perpendicular to the first direction and parallel to the top surface, the right structure compresses along the first direction and extends along the second direction, and the middle structure compresses along the second direction and extends along the first direction.

In some embodiments, when the compression force is applied on the MMM system along the first direction, the left bar and the right bar both extend along the second direction, and the middle bar extends along the first direction.

In some embodiments, when the compression force is applied on the MMM system along the first direction, the left bar and the right bar both extend along the second direction to convert a first portion of the compression force along the first direction to an orthogonal force in the second direction, and the middle bar extends along the first direction to reverse a second portion of the compression force in an opposite direction relative to the first direction.

In some embodiments, the top surface, the bottom surface, the left structure, the right structure and the middle structure are equally thick and have a first thickness.

In some embodiments, the left bar, the right bar and the middle bar are equally thick and have a second thickness.

In some embodiments, the first thickness is larger than the second thickness.

In another exemplary embodiment, a method of multi-directional load dissipation is described, including placing the MMM system between a subject and the compressive load.

In some embodiments, the method further includes orienting the MMM system so that the compressive load is perpendicular to the top surface of the MMM system.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings.

FIG. 5 is a series of images showing the physical behavior of MMM systems under increasing compressive displacement, according to certain embodiments.

DETAILED DESCRIPTION

Figure 1A:
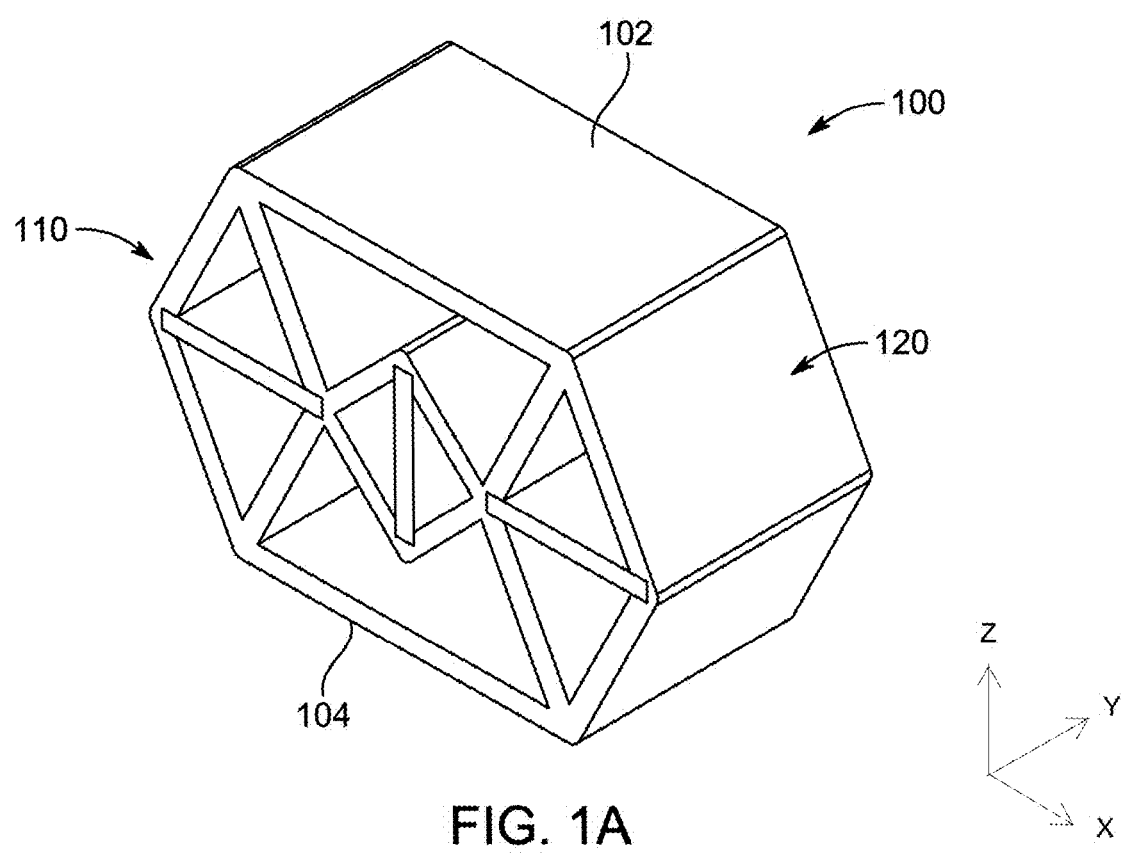
FIG. 1A is a perspective view of a multimaterial mechanical metamaterial (MMM) system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Figure 1B:
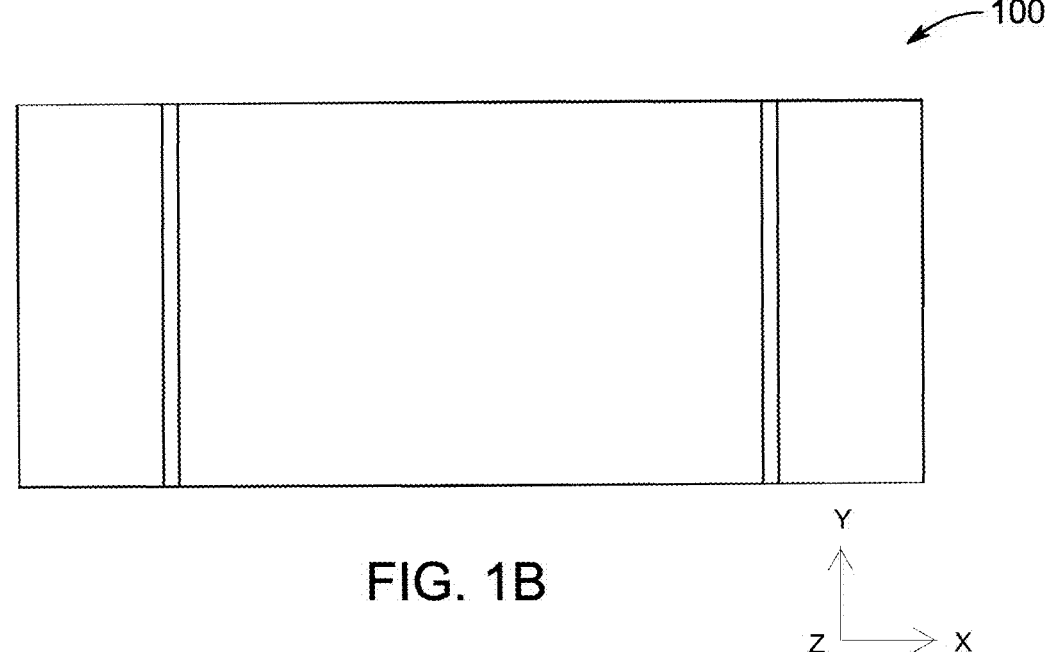
FIG. 1B is a top view of the MMM system of FIG. 1A, according to certain embodiments.
Figure 1C:
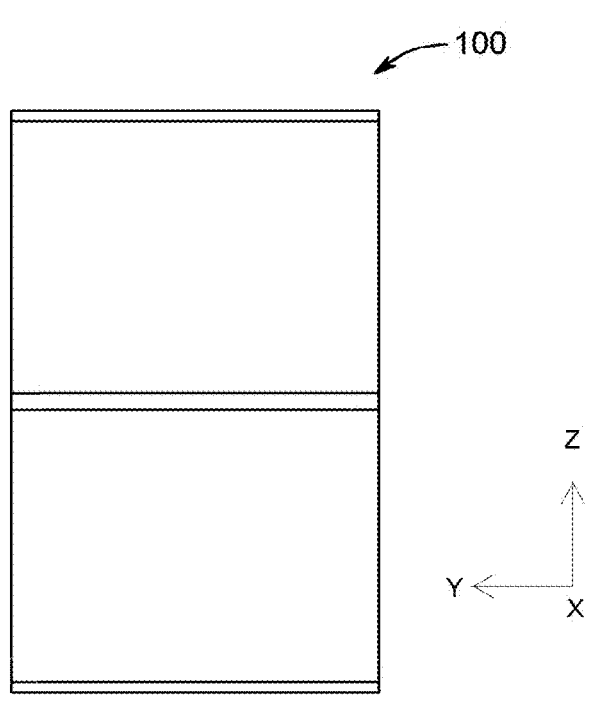
FIG. 1C is a side view of the MMM system of FIG. 1A, according to certain embodiments.
Figure 1D:
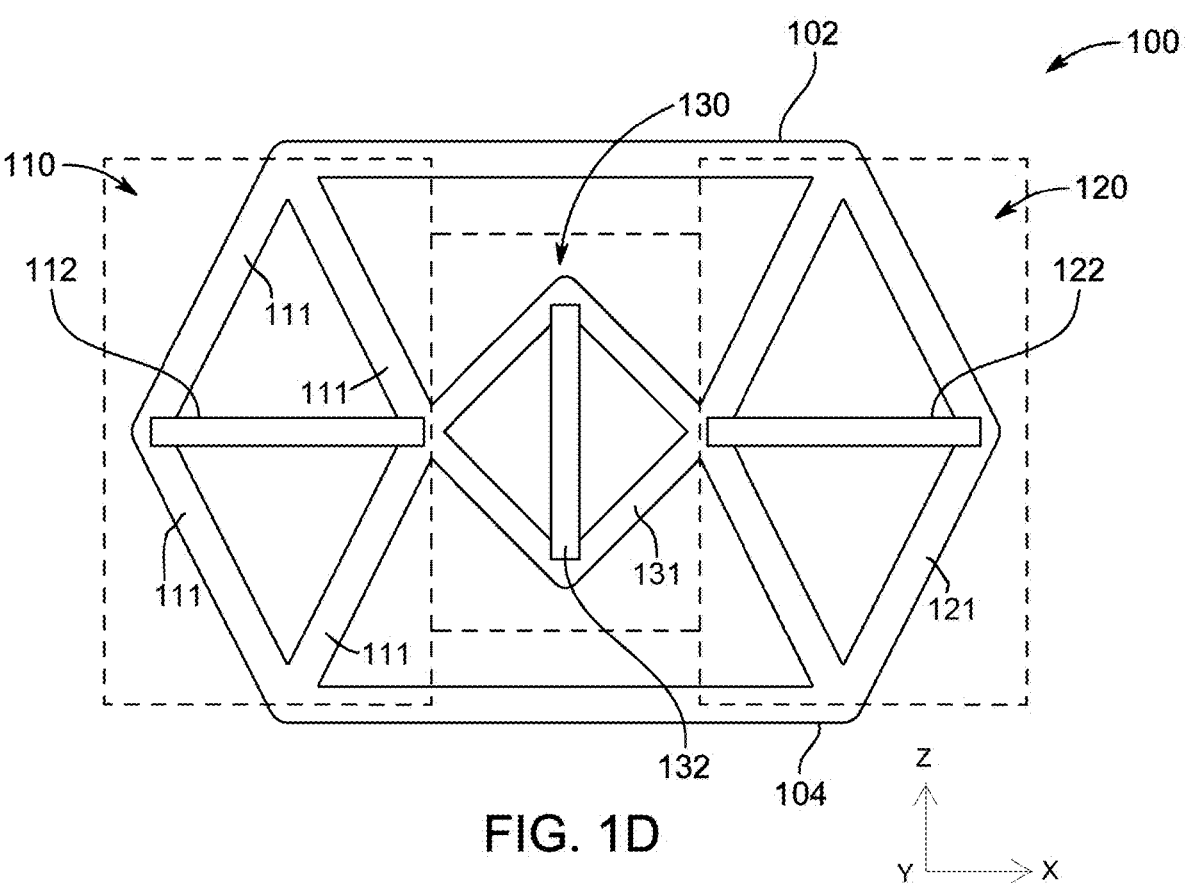
FIG. 1D is a cross-sectional view of the MMM system of FIG. 1A, according to certain embodiments.

Referring to FIGS. 1A-1D, illustrated are different views of a multimaterial mechanical metamaterial (MMM) system (as represented by reference numeral 100), as per embodiments of the present disclosure. Herein, FIG. 1A illustrates a perspective view of the MMM system 100, depicting its overall three-dimensional form as a prismatic body. FIG. 1B illustrates a top view of the MMM system 100, depicting overall width and thickness dimensions thereof. FIG. 1C illustrates a side view of the MMM system 100, depicting overall height dimensions thereof. FIG. 1D illustrates a cross-sectional view of the MMM system 100 showing the proportional relationships between different structural elements. These views collectively depict a structure with a defined cross-sectional geometry that is repeated along its depth (e.g. in the Y direction) to form the complete MMM system 100.

The MMM system 100 of the present disclosure provides multi-directional load dissipation capabilities through the strategic combination of materials with different elastic properties arranged in a specific geometric configuration. The MMM system 100 is configured as a three-dimensional structure having the prismatic body that extends along multiple orthogonal axes. The MMM system 100 includes multiple internal geometric features that are arranged to provide controlled deformation characteristics when subjected to compressive loading. The MMM system 100 is designed to receive compressive forces applied in a vertical direction (e.g. the Z direction) and redistribute portions of these forces in orthogonal and opposite directions through selective deformation of different material components. The overall configuration of the MMM system 100 enables multi-directional energy dissipation while maintaining structural integrity during loading conditions.

As illustrated in FIGS. 1A-1D in combination, the MMM system 100 includes a top surface 102 positioned at a top side of the MMM system 100. The top surface 102 can serve as a primary load-receiving surface for a compressive force applied to the MMM system 100. The top surface 102 extends laterally across the uppermost portion of the MMM system 100 to provide a continuous surface for uniform load distribution. The top surface 102 can be oriented substantially perpendicular to the intended direction of applied compressive loads to increase the effective area for force transmission. As shown, the top surface 102 connects to other structural elements of the MMM system 100 to form an integrated load path that enables efficient force transfer to the internal components. The configuration of the top surface 102 ensures that applied loads are transmitted uniformly to the underlying structural elements without introducing stress concentrations that could compromise the integrity of the MMM system 100.

The MMM system 100 also includes a bottom surface 104 positioned at a bottom side of the MMM system 100. The bottom surface 104 can serve as a primary reaction surface for the MMM system 100 when positioned against a supporting structure or object to be protected from compressive loads. The bottom surface 104 extends laterally across the lowermost portion of the MMM system 100 to provide a continuous surface for distributing reaction forces. The bottom surface 104 is oriented parallel to the top surface 102 to ensure uniform load distribution and proper alignment of the MMM system 100 during use. As shown, the bottom surface 104 connects to other structural elements of the MMM system 100 to complete the load path from the applied forces to the supporting structure. The configuration of the bottom surface 104 ensures that reaction forces are distributed uniformly to prevent localized stress concentrations that could damage the supporting surface or object being protected.

As better shown in FIG. 1D, the MMM system 100 includes a left structure 110 positioned at a left side of the MMM system 100 and including four left lateral faces 111 defining a left open-ended prism shape. The left structure 110 serves as one of the primary load-bearing elements that receives compressive forces from the top surface 102 and transmits these forces to a left bar 112 (as discussed later in detail) for redirection in orthogonal directions. The four left lateral faces 111 of the left structure 110 are arranged to form an elongated prismatic shape that extends between the top surface 102 and the bottom surface 104. The left open-ended prism shape of the left structure 110 is connected to the top surface 102 and the bottom surface 104 while maintaining the internal geometry necessary for proper deformation characteristics. The geometric configuration of the left structure 110 is designed to provide controlled deformation under compressive loading that enables the transfer of forces to the left bar 112. The left structure 110 maintains structural integrity during deformation while allowing the left bar 112 to extend in orthogonal directions as the MMM system 100 is compressed.

The MMM system 100 further includes a right structure 120 positioned at a right side of the MMM system 100 and including four right lateral faces 121 defining a right open-ended prism shape. The right structure 120 serves as a primary load-bearing element that operates in coordination with the left structure 110 to receive compressive forces and redirect portions of these forces through a right bar 122 (as discussed later in detail). The four right lateral faces 121 of the right structure 120 are arranged to form a prismatic configuration that mirrors the geometry of the left structure 110 to provide balanced load distribution characteristics. The right open-ended prism shape of the right structure 120 is connected to the top surface 102 and the bottom surface 104 while maintaining the internal geometry required for proper mechanical response. In the MMM system 100, the right structure 120 is designed to undergo controlled deformation that enables the right bar 122 to extend in orthogonal directions as compressive loads are applied. The geometric configuration of the right structure 120 ensures coordinated operation with the left structure 110 to achieve symmetrical load dissipation characteristics.

The MMM system 100 further includes a middle structure 130 positioned between the left structure 110 and the right structure 120 and including four middle lateral faces 131 defining a middle open-ended prism shape. The middle structure 130 serves as a central load-bearing element that provides structural connection between the left and right sides of the MMM system 100 while housing a middle bar 132 (as discussed later in detail) that provides load reversal functionality. The four middle lateral faces 131 of the middle structure 130 are arranged to form a prismatic shape that is distinct from the diamond configurations of the left structure 110 and right structure 120. The middle open-ended prism shape of the middle structure 130 is connected to the left structure 110 and the right structure 120 while maintaining the structural integrity necessary for proper load transmission. The middle structure 130 is positioned with controlled spacing (as will be discussed later) from the top surface 102 and the bottom surface 104 to enable independent deformation characteristics. The geometric configuration of the middle structure 130 allows for controlled compression in directions perpendicular to the applied load while enabling extension of the middle bar 132 in the direction of the applied load.

The MMM system 100 further includes the left bar 112 extending between a left edge and a right edge of the left open-ended prism shape of the left structure 110. The left bar 112 serves as a primary force redirection element for the left side of the MMM system 100 and is configured to dissipate part of applied compressive loads to an orthogonal direction. The left bar 112 is positioned within the interior space defined by the left open-ended prism shape of the left structure 110, extending horizontally between opposing edges of the diamond-shaped cross-section. The left bar 112 is aligned parallel to the top surface 102 and the bottom surface 104 when no compression or stretching force is applied to the MMM system 100. The geometric relationship between the left bar 112 and the left structure 110 enables the transfer of vertical compressive forces to horizontal tensile forces in the left bar 112. Herein, the left bar 112 is configured to undergo controlled extension in the orthogonal direction as the left structure 110 compresses under applied loads.

The MMM system 100 further includes the right bar 122 extending between a left edge and a right edge of the right open-ended prism shape of the right structure 120. The right bar 122 operates in coordination with the left bar 112 to provide balanced orthogonal load dissipation across the width of the MMM system 100. The right bar 122 and the left bar 112 together are configured to dissipate a first portion of an applied compressive load to an orthogonal direction of the applied compressive load. The right bar 122 is positioned within the interior space defined by the right open-ended prism shape of the right structure 120, extending horizontally between opposing edges of the diamond-shaped cross-section. The right bar 122 maintains parallel alignment with the top surface 102 and the bottom surface 104 when the MMM system 100 is in an unloaded condition. The geometric relationship between the right bar 122 and the right structure 120 enables the transfer of vertical compressive forces to horizontal tensile forces in the right bar 122. Herein, the right bar 122 is configured to undergo controlled extension in the orthogonal direction as the right structure 120 compresses under applied loads, providing force dissipation characteristics that complement those of the left bar 112.

The MMM system 100 further includes the middle bar 132 extending between a top edge and a bottom edge of the middle open-ended prism shape of the middle structure 130. The middle bar 132 serves as a load reversal element of the MMM system 100 and is configured to reverse a second portion of the compressive load in an opposite direction relative to the applied load. The middle bar 132 is positioned within the interior space defined by the middle open-ended prism shape of the middle structure 130, extending vertically between the top and bottom edges of the square-shaped cross-section. The middle bar 132 is oriented perpendicular to the top surface 102 and parallel to the direction of applied compressive forces when the MMM system 100 is in an unloaded condition. The geometric relationship between the middle bar 132 and the middle structure 130 enables the middle bar 132 to extend in the opposite direction of the applied load as the middle structure 130 undergoes compression. Herein, the middle bar 132 provides load reversal functionality that complements the orthogonal load dissipation provided by the left bar 112 and the right bar 122.

The geometric configuration of the components of the MMM system 100 when no compression or stretching force is applied on the MMM system 100 is now described with reference to FIGS. 1A-1D in combination. In such a configuration, the top surface 102, the bottom surface 104, the left bar 112, and the right bar 122 are parallel to one another. The middle bar 132 is oriented perpendicular to the top surface 102, the bottom surface 104, the left bar 112, and the right bar 122. The left structure 110 is in direct contact with the top surface 102 and the bottom surface 104. The right structure 120 is in direct contact with the top surface 102 and the bottom surface 104. The middle structure 130 is spaced apart from the top surface 102 and the bottom surface 104. The middle structure 130 is in direct contact with the left structure 110 and the right structure 120.

Further, in a cross section perpendicular to both the middle bar 132 and the top surface 102 (for example as shown in FIG. 1D), the left structure 110 has a diamond shape, and the right structure 120 has a diamond shape. The middle structure 130 has a square shape. A top edge of the left structure 110 is in direct contact with a left end of the top surface 102. A bottom edge of the left structure 110 is in direct contact with a left end of the bottom surface 104. A top edge of the right structure 120 is in direct contact with a right end of the top surface 102. A bottom edge of the right structure 120 is in direct contact with a right end of the bottom surface 104. A left edge of the middle structure 130 is in direct contact with a right edge of the left structure 110. A right edge of the middle structure 130 is in direct contact with a left edge of the right structure 120. In some embodiments, the top edge, the bottom edge, a left edge and the right edge of the left structure 110 and the top edge, the bottom edge, the left edge and a right edge of the right structure 120 include fillet ends that are curved. Further, a top edge of the middle bar 132 is spaced apart from the top surface 102 by a first distance in the Z direction. A bottom edge of the middle bar 132 is spaced apart from the bottom surface 104 by a second distance in the Z direction that is equal to the first distance. The specific interconnections between these structures are further detailed.

In a non-limiting example, the MMM system 100 can exhibit specific dimensional relationships and geometric features that enable the multi-directional load dissipation functionality. In FIG. 1B, the MMM system 100 has an overall width of approximately 47.5 mm in the X direction and an overall thickness or depth of approximately 20 mm in the Y direction. In FIG. 1C, the MMM system 100 has an overall height of approximately 32 mm in the Z direction. In FIG. 1D, the four left lateral faces 111 and the four right lateral faces 121 each have a length of 16.77 mm in the XZ plane. The four middle lateral faces 131 each have a length of 9.64 mm in the XZ plane. The left bar 112 and the right bar 122 each have a length of 15 mm in the X direction. The middle bar 132 has a length of 14 mm in the Z direction. The top surface 102 and the bottom surface 104 each have a length of 30.5 mm in the X direction. To avoid sharp edges, the middle structure 130 may have fillet ends having a radius of 0.8 mm where two neighboring middle lateral surface (e.g. 131) are connected. Similarly, the left structure 110 may have fillet ends having a radius of 1 mm where two neighboring left lateral surface (e.g. 111) are connected. The right structure 120 may have fillet ends having a radius of 1 mm where two neighboring right lateral surface (e.g. 121) are connected. It may be noted that the given dimensions are exemplary only and shall not be construed as limiting to the present disclosure.

In the MMM system 100, the top surface 102 maintains a planar configuration that provides contact with external loading surfaces or objects. The surface finish and geometry of the top surface 102 are selected to reduce friction effects and ensure uniform load distribution across the width of the MMM system 100. Further, the thickness of the top surface 102 is designed to provide adequate strength for load transmission while maintaining the overall geometric proportions of the MMM system 100. The top surface 102 forms integral connections with the left structure 110 and the right structure 120 to establish continuous load paths between the external loading surface and the internal deformation elements. Herein, the material composition of the top surface 102 is selected to provide the necessary stiffness characteristics for effective load transmission while maintaining compatibility with the overall multimaterial construction of the MMM system 100.

The bottom surface 104 maintains geometric characteristics that complement the top surface 102 to provide balanced load distribution characteristics. The surface area and thickness of the bottom surface 104 are selected to provide adequate contact area for reaction force distribution while maintaining the overall proportional relationships of the MMM system 100. The bottom surface 104 forms integral connections with the left structure 110 and the right structure 120 to establish complete structural continuity of the MMM system 100. The material properties of the bottom surface 104 are designed to provide the necessary strength and stiffness for reaction force distribution while maintaining consistency with the multimaterial construction approach. In present examples, the bottom surface 104 incorporates features that ensure proper alignment and positioning of the MMM system 100 when placed between a compressive load source and a protected object or surface.

As depicted in FIG. 1D, the left structure 110 exhibits a diamond-shaped cross-section when viewed perpendicular to both the middle bar 132 and the top surface 102. This diamond configuration provides angled surfaces that facilitate the transfer of vertical compressive forces to horizontal tensile forces in the left bar 112. The diamond shape of the left structure 110 includes the four left lateral faces 111 that converge at acute angles to form the characteristic diamond geometry. The dimensional relationships of the diamond shape are selected to improve the force transmission characteristics while maintaining adequate structural strength. Herein, the diamond configuration of the left structure 110 enables controlled deformation that gradually engages the left bar 112 as compressive displacement increases. It may be noted that the geometric proportions of the left structure 110 are coordinated with the dimensions of the left bar 112 to ensure enhanced mechanical coupling between these components.

In particular, the left structure 110 includes specific edge configurations that provide controlled contact interfaces with adjacent structural elements of the MMM system 100. Herein, the top edge of the left structure 110 is in direct contact with a left end of the top surface 102, establishing a load path for compressive forces applied to the MMM system 100. The bottom edge of the left structure 110 is in direct contact with a left end of the bottom surface 104, completing the structural continuity and providing reaction force distribution. The right edge of the left structure 110 is in direct contact with a left edge of the middle structure 130, enabling load transfer between the left and middle sections of the MMM system 100. These contact interfaces are designed to provide structural continuity while allowing for the relative motion necessary for proper deformation characteristics. As shown, the edge configurations of the left structure 110 may include fillet ends that are curved to reduce stress concentrations and provide smooth load transitions between adjacent components.

Similarly, the right structure 120 exhibits a diamond-shaped cross-section that corresponds to the configuration of the left structure 110, providing balanced mechanical response characteristics across the width of the MMM system 100. The diamond shape of the right structure 120 includes the four right lateral faces 121 arranged at angles that facilitate the conversion of vertical compressive forces to horizontal tensile forces in the right bar 122. The dimensional proportions of the right structure 120 are selected to match those of the left structure 110 to ensure uniform load distribution and deformation characteristics. The diamond configuration provides the geometric relationships necessary for proper force transmission to the right bar 122 during compression. Herein, the right structure 120 maintains structural integrity while allowing the right bar 122 to extend orthogonally as the MMM system 100 undergoes compressive deformation. It may be noted that the geometric features of the right structure 120 are coordinated with the dimensions of the right bar 122 to enable the mechanical coupling between these components. The MMM system 100 is symmetric about an axis defined by the middle bar 132. The MMM system 100 is also symmetric about an axis defined by the left bar 112 and the right bar 122.

In particular, the right structure 120 includes edge configurations that establish contact interfaces with adjacent components of the MMM system 100. The top edge of the right structure 120 is in direct contact with a right end of the top surface 102, providing a load path for compressive forces applied to the MMM system 100. The bottom edge of the right structure 120 is in direct contact with a right end of the bottom surface 104, establishing structural continuity and reaction force distribution. The left edge of the right structure 120 is in direct contact with a right edge of the middle structure 130, enabling load transfer between the right and middle sections of the MMM system 100. These contact relationships ensure proper load distribution while allowing for the relative deformation necessary for multidirectional force dissipation. As shown, the edge configurations of the right structure 120 may include fillet ends that are curved to reduce stress concentrations and provide smooth transitions between structural components.

Further, as depicted in FIG. 1D, the middle structure 130 exhibits a square-shaped cross-section when viewed perpendicular to both the middle bar 132 and the top surface 102. The square configuration of the middle structure 130 provides uniform loading characteristics in lateral directions while maintaining the geometric relationships necessary for proper interaction with the left structure 110 and the right structure 120. The four middle lateral faces 131 of the square configuration are oriented to provide enhanced load transfer characteristics to the middle bar 132. The dimensional proportions of the square shape are selected to coordinate with the diamond shapes of the left structure 110 and the right structure 120 while providing the geometric features necessary for operation of the middle bar 132. The square configuration ensures uniform stress distribution in the middle structure 130 during compression while enabling the controlled deformation required for load reversal functionality. The geometric relationships between the square shape and the adjacent diamond shapes provide the mechanical coupling necessary for coordinated operation of structural elements.

In particular, the middle structure 130 is spaced apart from the top surface 102 and the bottom surface 104, which enables independent deformation characteristics that are essential for the load reversal functionality. This spacing allows the middle structure 130 to compress in directions perpendicular to the applied load without direct interference from the top surface 102 and bottom surface 104. The spacing dimensions are selected to provide adequate clearance for the intended range of deformation while maintaining structural stability. The middle structure 130 is in direct contact with the left structure 110 and the right structure 120 to establish load paths between these components while maintaining the controlled spacing from the top and bottom surfaces. The spacing configuration ensures that the middle structure 130 engages progressively as compression increases, providing the sequential loading characteristics necessary for multi-directional load dissipation. The controlled spacing enables the middle bar 132 to extend in the opposite direction to the applied load as the middle structure 130 undergoes compression.

Further, the spacing of the middle structure 130 and the middle bar 132 is controlled. As discussed and shown in the cross-section shown in FIG. 1D, the top edge of the middle bar 132 is spaced apart from the top surface 102 by the first distance. Similarly, the bottom edge of the middle bar 132 is spaced apart from the bottom surface 104 by the second distance that is equal to the first distance. This symmetric spacing ensures a balanced tensile response from the middle bar 132 when the middle structure 130 is compressed.

Furthermore, herein, the MMM system 100 incorporates a multimaterial construction where the top surface 102, the bottom surface 104, the left structure 110, the right structure 120 and the middle structure 130 include a first material; and the left bar 112, the right bar 122 and the middle bar 132 include a second material that is more elastic than the first material. The first material provides the structural framework of the MMM system 100, selected for its rigid properties to ensure structural stability and effective load transmission. The first material forms the load-bearing components that receive an applied compressive load and direct the force into the more elastic components of the system. The stiffness of the first material maintains the overall geometry of the system under initial loading while permitting controlled deformation as the load increases. The second material forms the elastic components of the MMM system 100 and is selected for its flexible properties to enable energy absorption and load redirection. The second material responds to forces transmitted by the rigid components made from the first material. The function of the second material is to deform and extend under tension, thereby converting a portion of a compressive load into stored elastic energy and redirecting forces into new directions.

In the present embodiments, the first material is less elastic than the second material. This difference in elasticity creates the stiffness differential that enables the multi-directional load dissipation function of the MMM system 100. The rigidity of the first material ensures that deformation is concentrated in the components made from the second material, thereby guiding the mechanical response of the MMM system 100. The second material being more elastic than the first material, allows the components made from the second material to undergo significant extension without failure, which along with the geometry design is the mechanism for dissipating a first portion of a load to an orthogonal direction and reversing a second portion of the load in an opposite direction. The flexibility of the second material allows the MMM system 100 to have a non-linear response to a compressive load, where different dissipation mechanisms are engaged at different stages of deformation.

In an embodiment, the first material is polylactic acid (PLA). PLA is a rigid thermoplastic material that provides the structural framework for the MMM system 100. The components made of PLA, such as the left structure 110, the right structure 120, and the middle structure 130, are configured to act as the primary load-bearing elements. Due to the stiffness of PLA, these structures receive an initial compressive load F (see FIG. 2) and effectively transfer the load into the more elastic components of the MMM system 100. The rigidity of the PLA components ensures the MMM system 100 maintains its geometry under initial loading and anchors the deformation of the more flexible elements. The use of PLA provides the necessary stiffness for the load-bearing function and is compatible with additive manufacturing processes used to fabricate the MMM system 100.

Further, the second material is thermoplastic polyurethane (TPU). TPU is a flexible elastomeric material that provides elasticity to the MMM system 100. The components made of TPU, which include the left bar 112, the right bar 122, and the middle bar 132, are configured to absorb energy and redirect the compressive load through deformation. The high elasticity of TPU allows these bar components to undergo elongation. The left bar 112 and the right bar 122 are configured to elongate laterally in the X direction to dissipate a portion of the compressive load to an orthogonal direction of the compressive load in the Z direction. The middle bar 132 is configured to elongate vertically in the Z direction in opposition to the compressive load, thereby reversing a portion of the compressive load in an opposite direction. The use of TPU provides the necessary flexibility for this multi-directional load dissipation mechanism.

In some embodiments, the top surface 102, the bottom surface 104, the left structure 110, the right structure 120 and the middle structure 130 can be one monolithic piece. This monolithic construction ensures structural continuity and eliminates potential failure points that could occur at joints or interfaces between separate components. The monolithic approach provides uniform material properties in the structural framework and ensures consistent load transfer characteristics. The integration of structural components into a single monolithic piece simplifies the manufacturing process while improving mechanical performance. The monolithic construction also eliminates the need for assembly operations.

In some embodiments, the top surface 102, the bottom surface 104, the left structure 110, the right structure 120 and the middle structure 130 consist of the first material. By forming these load-bearing and force-transmitting elements entirely from the rigid first material, the MMM system 100 is provided with a uniform and stable frame. This construction ensures that the mechanical properties of the structural framework are consistent, allowing the framework to effectively receive a compressive load and direct the force into the separate components that consist of the second material. Further, the left bar 112, the right bar 122 and the middle bar 132 consist of the second material. By forming these bars entirely from the more elastic second material, the function of energy dissipation and load redirection is concentrated within these specific elements. This exclusive composition allows the left bar 112, the right bar 122, and the middle bar 132 to undergo the large elastic deformation necessary to dissipate a first portion of a compressive load to an orthogonal direction and to reverse a second portion of the compressive load in an opposite direction.

Figures 2, 3:
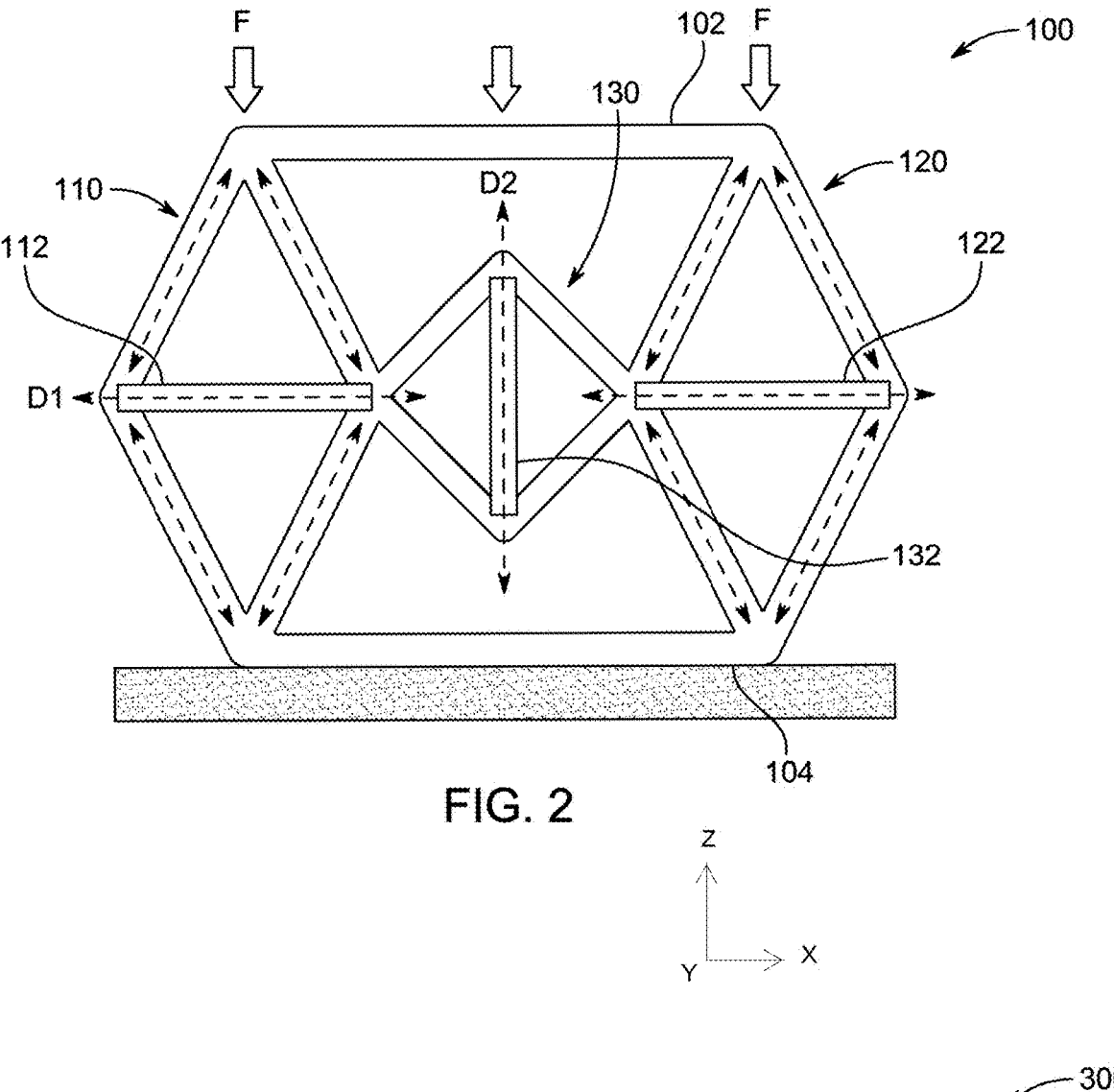
FIG. 2 is a schematic cross-sectional view of the MMM system, illustrating the dissipation of a compressive load in an orthogonal direction and an opposite direction, according to certain embodiments.
FIG. 3 shows a method of multi-directional load dissipation using an MMM system, according to certain embodiments.
Figure 4:
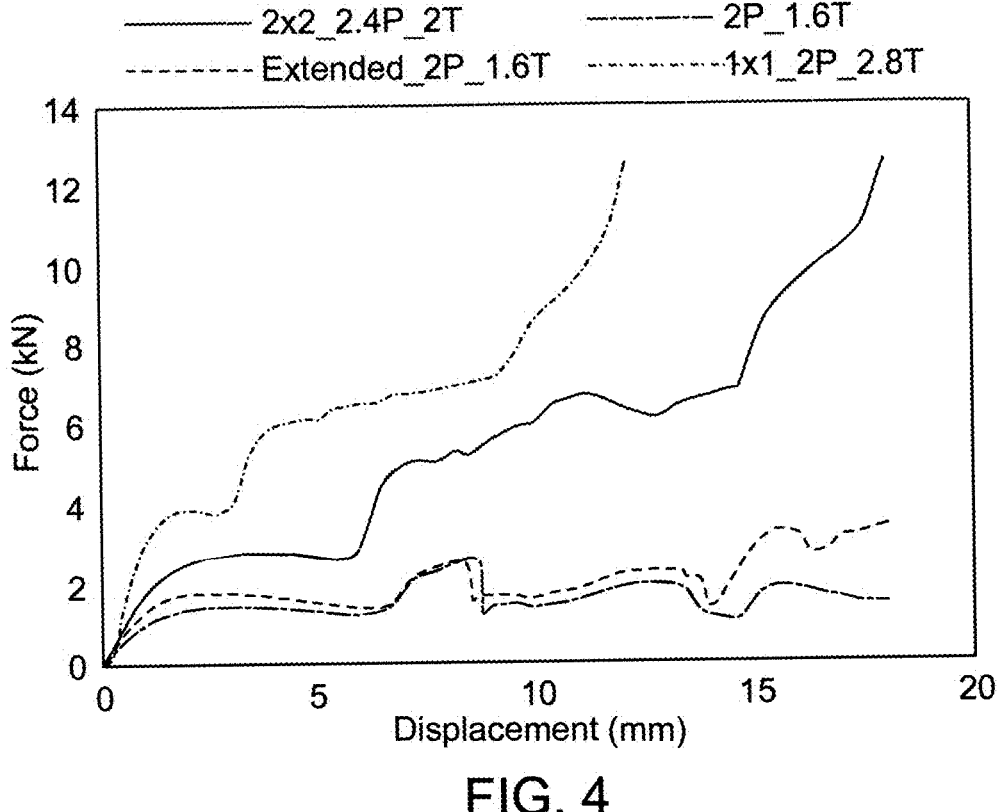
FIG. 4 is a graph showing exemplary force versus displacement curves from compression testing of MMM systems, according to certain embodiments.
Figure 5:
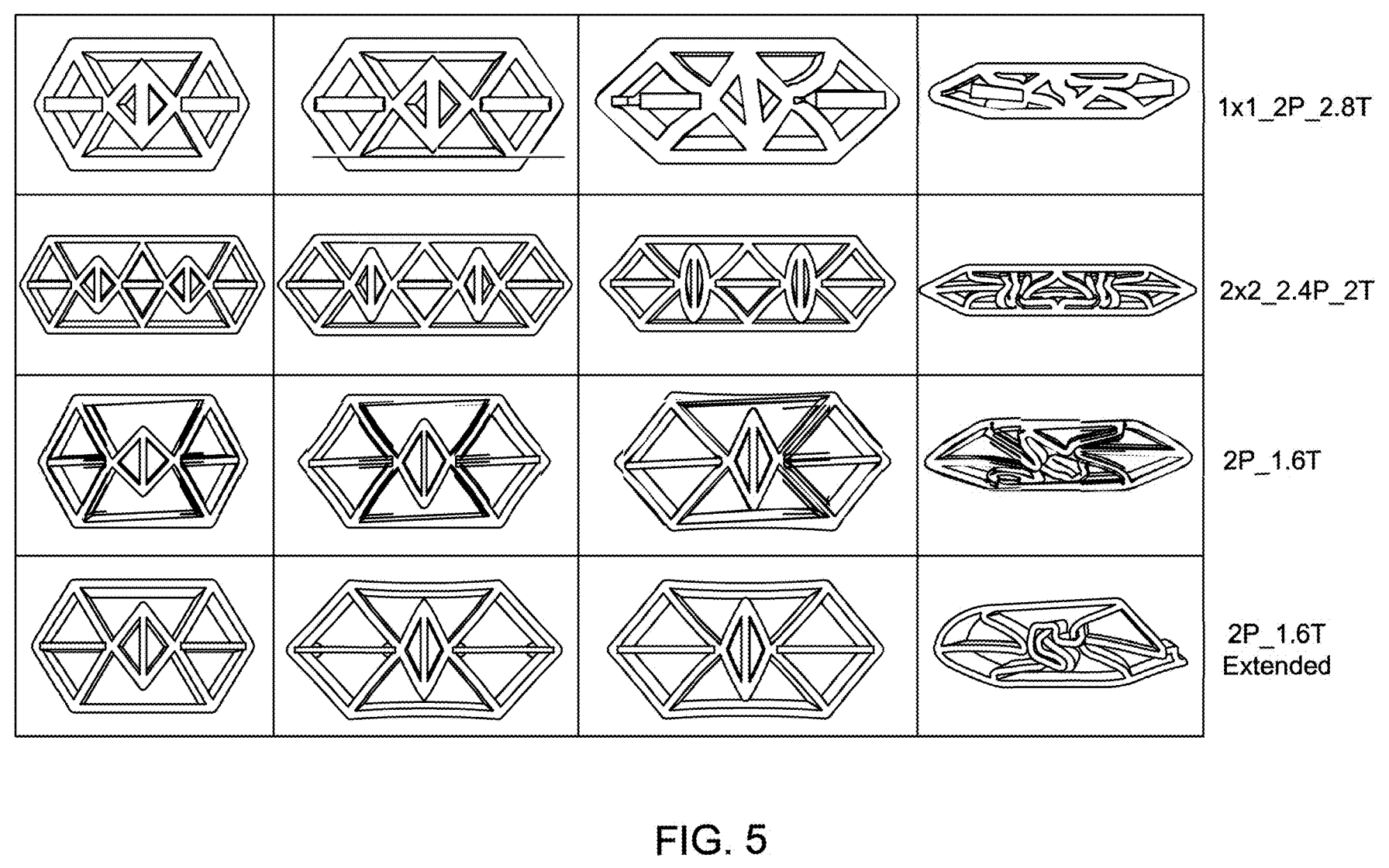
Figure 6:
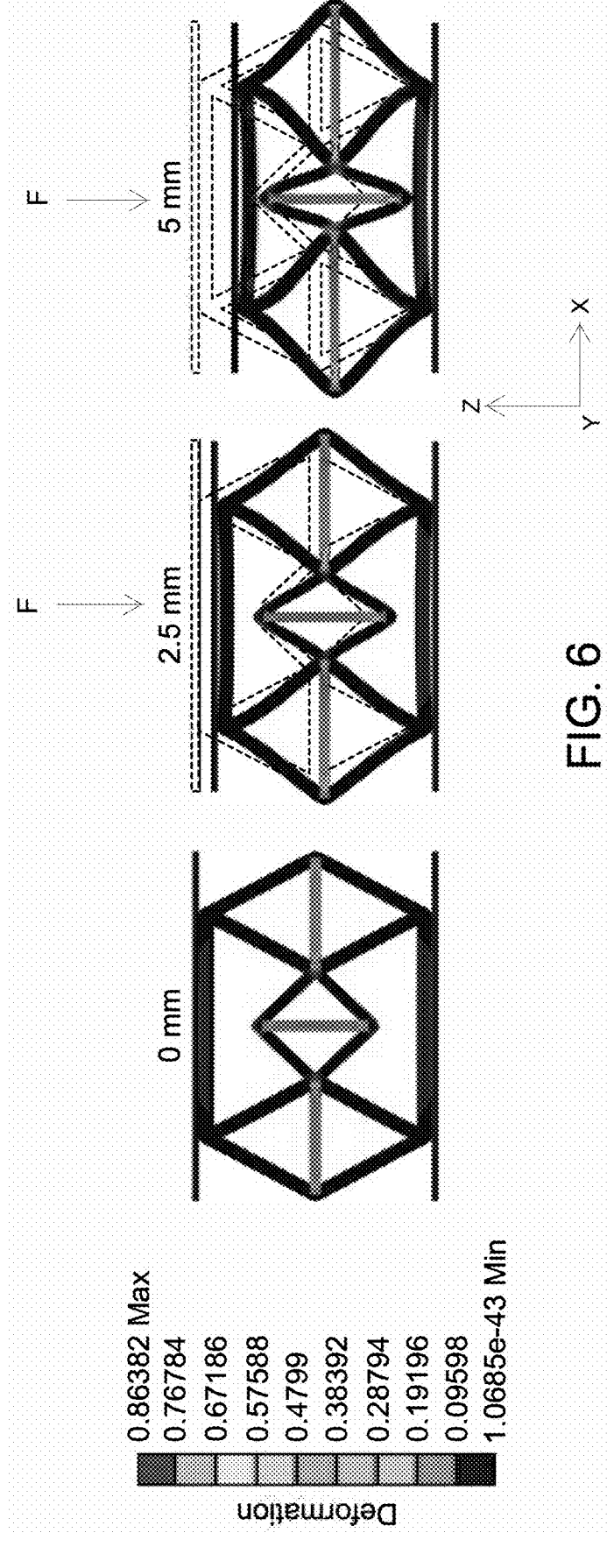
FIG. 6 is a series of images from a finite element analysis showing the deformation of an MMM system under increasing compressive displacement, according to certain embodiments.

Now, the primary function of the MMM system 100 is realized upon the application of a compressive load F, as illustrated in FIG. 2 and may also be seen in FIGS. 4-6. The compressive load F is applied along a first direction (e.g. the Z direction) that is perpendicular to the top surface 102. In such a configuration, the left bar 112 and the right bar 122 are configured to dissipate a first portion of the compressive load F to an orthogonal direction D1 (e.g. the X direction), and the middle bar 132 is configured to reverse a second portion of the compressive load in an opposite direction D2 (e.g. the Z direction). Specifically, when this force is applied, the MMM system 100 initiates a two-stage response to dissipate the energy. Upon application of the compressive load F, the left bar 112 and the right bar 122 are configured to extend and dissipate a first portion of the compressive load F to the orthogonal direction D1, which is perpendicular to the direction of the compressive load F. Concurrently or subsequently, as displacement increases, the middle bar 132 is configured to extend and reverse a second portion of the compressive load F in the opposite direction D2, which is parallel but opposite to the direction of the initial compressive load F. Such mechanical response is a direct result of the geometry and material distribution.

Also, when the compression force is applied on the MMM system 100 along the first direction perpendicular to the top surface 102, the left structure 110 compresses along the first direction and extends along the second direction (D1) that is perpendicular to the first direction and parallel to the top surface 102, the right structure 120 compresses along the first direction and extends along the second direction D1, and the middle structure 130 compresses along the second direction D1 and extends along the first direction. The diamond shape of the left structure 110 and the right structure 120 dictates this behavior; a vertical compressive force inherently causes the structures to shorten vertically and widen horizontally. This horizontal expansion in the second direction D1 is an initial step that transfers the load path from the vertical axis to the horizontal plane. This horizontal expansion of the left structure 110 and the right structure 120 exerts an inward, compressive force on the middle structure 130 along the second direction D1. In response, the square-shaped middle structure 130 deforms by shortening horizontally in the X direction and elongating vertically along the first direction (e.g. the Z direction), which drives the subsequent load reversal stage of the mechanism.

Further, as a direct consequence of the structural deformations, when the compression force is applied on the MMM system 100 along the first direction, the left bar 112 and the right bar 122 both extend along the second direction D1, and the middle bar 132 extends along the first direction. The horizontal extension of the left structure 110 and the right structure 120 in the second direction D1 places the left bar 112 and the right bar 122 under tension. Made of the elastic second material, the left bar 112 and the right bar 122 accommodate this tension by elongating substantially along the second direction D1. Similarly, the vertical extension of the middle structure 130 along the first direction places the vertically-oriented middle bar 132 under tension. The middle bar 132, also being made of the second material, therefore elongates along this first direction in response to the deformation of its surrounding frame.

Further, when the compression force is applied on the MMM system 100 along the first direction, the left bar 112 and the right bar 122 both extend along the second direction D1 to convert a first portion of the compression force along the first direction to an orthogonal force in the second direction D1, and the middle bar 132 extends along the first direction to reverse a second portion of the compression force in an opposite direction D2 relative to the first direction. Herein, the elongation of the bars serves a specific energy dissipating function. The energy of the vertical compression is converted into stored elastic potential energy within the stretched left bar 112 and right bar 122, creating a resistive tensile force that acts purely in the orthogonal second direction D1. This process effectively redirects a portion of the initial impact energy into the horizontal plane. Subsequently, the energy transferred to the middle structure 130 is converted into stored elastic potential energy in the vertically stretched middle bar 132. The resulting tensile force in the middle bar 132 acts along the first direction but in opposition to the applied compressive load, effectively creating a reactive force that pushes back and reverses a portion of the load.

Furthermore, the relative thickness of the different material components is also a design parameter. In some embodiments, the top surface 102, the bottom surface 104, the left structure 110, the right structure 120 and the middle structure 130 can be equally thick and have a first thickness of 1.0 to 5.0 mm e.g. 1.0 mm, 1.5 mm, 2.0 mm, 3.0 mm, 4.0 mm, 4.5 mm, 5.0 mm or any values therebetween. This uniformity in the first thickness ensures that the structural framework of the MMM system 100 behaves as a cohesive, monolithic unit under load. By maintaining an equal thickness, for example 2.0 mm or 2.4 mm, across all components made of the first material, the applied compressive force is distributed evenly in the load-bearing diamond and square shapes. This prevents localized stress concentrations and ensures a predictable geometric deformation, where the entire rigid frame compresses and expands uniformly, which can help properly actuating the elastic bar elements. This consistent thickness of the rigid framework ensures that the transfer of forces from the initial impact points to the internal structures occurs as designed, maintaining the structural integrity required to drive the subsequent energy dissipation stages.

Further, the left bar 112, the right bar 122 and the middle bar 132 can be equally thick and have a second thickness of 0.5 to 3.0 mm e.g. 0.5 mm, 1.0 mm, 1.5 mm, 2.0 mm, 2.5 mm, 3.0 mm or any values therebetween. This consistent second thickness, for instance 1.6 mm or 2.0 mm, can help enable balanced and symmetrical function of the energy-dissipating elements. As these bars are composed of the highly elastic second material, their uniform cross-sectional area ensures that they exhibit a consistent tensile response when stretched. The equal thickness of these elastic members provides a predictable and repeatable stretching behavior that is fundamental to the controlled redirection of the compressive load into orthogonal and opposite directions.

In some embodiments, for the intended function of the MMM system 100, the first thickness is larger than the second thickness. This specific relationship between the thicknesses of the rigid and elastic components can determine the sequence of mechanical events during compression. The greater first thickness provides the components made of the first material with higher stiffness and structural integrity, allowing them to bear the initial compressive load and control the overall geometric deformation of the MMM system 100 without buckling prematurely. In contrast, the smaller second thickness of the bars made from the second material ensures they have a lower tensile stiffness, making them more susceptible to elongation. This differential ensures that the thicker frame deforms geometrically first, and this deformation then imposes a tensile force that stretches the thinner, more flexible bars.

The function of the MMM system 100 is now described in further detail. Upon application of a compressive load F, the left structure 110 and the right structure 120, which have a diamond shape and include the first material, serve as the initial load-bearing elements. Due to the angled geometry of the left structure 110 and the right structure 120, a compressive stress is transferred laterally toward the middle structure 130. This lateral force transfer places the left bar 112 and the right bar 122 under an axial, elongating load. As the left bar 112 and the right bar 122 include of the more elastic second material, the left bar 112 and the right bar 122 extend laterally in an orthogonal direction relative to the applied compressive load F. This elongation converts a vertical compressive load into a transverse force, providing a first mechanism for load redirection and energy absorption. The components including the first material, such as the left structure 110 and the right structure 120, anchor this deformation, resulting in a controlled pattern that channels the load perpendicularly.

The mechanical response of the MMM system 100 occurs in a sequential manner. During initial stages of compression, the middle structure 130 remains unengaged because the middle structure 130 is spaced apart from the top surface 102 and the bottom surface 104. As the deformation of the MMM system 100 progresses, the lateral expansion of the left structure 110 and the right structure 120 causes the middle structure 130 to compress in a direction perpendicular to the applied compressive load F. The middle structure 130 serves to tessellate the struts of the MMM system 100 and acts as a structural frame to stabilize the middle region during high displacement. This delayed engagement of the middle structure 130 allows for the sequential activation of the middle bar 132.

The engagement of the middle structure 130 initiates a second stage of load dissipation. As the middle structure 130 is compressed laterally, the middle bar 132, which is oriented vertically, is placed under tension and begins to elongate in a direction that is opposite to the direction of the applied compressive load F. This elongation of the middle bar 132 reverses the direction of a second portion of the applied load, providing a mechanism to resist further compression and dissipate additional force and energy. This vertical placement and material behavior of the middle bar 132, combined with the delayed activation, provides for a multi-stage load dissipation response.

Referring now to FIG. 3, illustrated is a flowchart of a method 300 of multi-directional load dissipation using the MMM system 100. The method 300 provides a practical application for the unique properties of the MMM system 100, for instance, in protective equipment or impact absorption systems. The method 300 leverages the passive mechanical response of the MMM system 100 to protect a subject from a compressive load.

The method 300 includes placing the MMM system 100 between a subject and the compressive load. In this step, the MMM system 100 is positioned as an intermediary layer. The subject could be a person, a sensitive piece of equipment, or any object that needs to be shielded from the full force of an impact. The compressive load could originate from an impact, a shockwave, or a sustained pressure source. The bottom surface 104 of the MMM system 100 would typically be placed against the subject to be protected, while the top surface 102 faces the anticipated direction of the load.

The method 300 can further include orienting the MMM system 100 so that the compressive load is perpendicular to the top surface 102 of the MMM system 100. By aligning the primary axis of the compressive load with the axis perpendicular to the top surface 102 and the bottom surface 104, the load is properly channeled into the left structure 110 and the right structure 120. This alignment ensures the initiation of the intended deformation sequence, leading to the efficient dissipation of the load first in the orthogonal direction D1 and subsequently in the opposite direction D2, thereby providing enhanced protection to the subject.

As used herein, the term "a subject" broadly encompasses any object, surface, or body that is positioned to receive or bear a compressive load. The subject may include, but is not limited to, a human or animal body, a portion thereof, or a non-biological structure such as a component, surface, or assembly used in industrial, architectural, or construction applications, such as a structural element or panel in a building or machine.

Referring further to FIGS. 4, 5, and 6, experimental and analytical validation of the MMM system 100 demonstrates the effectiveness of the multi-directional load dissipation approach through actual testing of physical prototypes and finite element analysis. In particular, the mechanical behavior and effectiveness of the MMM system 100 were validated through quasi-static compression testing of physical prototypes and finite element analysis (FEA). Four different configurations of the MMM system 100 were fabricated and tested to evaluate the influence of unit cell arrangement and the relative thicknesses of the first material (PLA) and the second material (TPU). The designs are designated based on their configuration; for example, "2×2_2.4P_2T" refers to a prototype with a 2×2 arrangement of unit cells, where the PLA struts have a thickness of 2.4 mm and the TPU struts have a thickness of 2 mm. The MMM system 100 shown in FIG. 1A can be one cell of the 2×2 arrangement of unit cells. Similarly, "2P_1.6T" refers to a single unit cell with 2 mm thick PLA and 1.6 mm thick TPU. "1×1_2P_2.8T" refers to a single unit cell with 2 mm thick PLA and 2.8 mm thick TPU. "Extended_2P_1.6T" refers to a single unit cell with 2 mm thick PLA and 1.6 mm thick TPU where TPU struts are extended within PLA struts to enhance surface adhesion by increasing the interfacial contact area between the two materials. This design not only strengthens the bond between PLA and TPU but also improves grip performance when the TPU is extended.

FIG. 4 presents a series of images showing the physical behavior of the different MMM system 100 prototypes at various stages of compressive displacement. These images visually confirm the multi-directional load dissipation mechanism. In the initial stages of compression, deformation is concentrated in the left structure 110 and the right structure 120. As the vertical load increases, these structures visibly compress vertically and expand horizontally, causing the horizontal left bar 112 and the right bar 122 to stretch, thereby dissipating the force in a direction perpendicular to the applied load. As the displacement continues, the middle structure 130, which was initially unengaged, begins to compress horizontally. This action causes the middle bar 132 to elongate, creating a force that opposes the direction of the initial compression. This visual evidence directly corresponds to the functions of orthogonal dissipation and subsequent load reversal. The fourth design ("1×1_2P_2.8T", as shown) which has a greater thickness of the second material (TPU) compared to the first material (PLA), is observed to fail at the multi-material interface, confirming the importance of the proposed thickness relationship where the first thickness of the rigid material is larger than the second thickness of the elastic material for proper function.

FIG. 5 presents a graph showing the force versus displacement curves obtained from quasi-static compression testing of the four prototypes at a rate of 2 mm/min. The curves demonstrate the efficient load-bearing capacity of the MMM system 100. Notably, the designs exhibit multiple peaks in their force-displacement profiles, such as those seen for the "2×2_2.4P_2T" and "1×1_2P_2.8T" configurations. This multi-peak behavior is indicative of the sequential engagement of the different load-dissipating mechanisms within the structure. The initial rise in force corresponds to the compression of the left structure 110 and the right structure 120 and the orthogonal dissipation via the left bar 112 and the right bar 122. Subsequent peaks correspond to the engagement and deformation of the middle structure 130 and the activation of the load-reversing middle bar 132. This ability to sustain load at higher strains and exhibit multiple load-bearing phases confirms the effectiveness of the multi-stage energy absorption design.

FIG. 6 presents images from a finite element analysis (FEA) that simulates the deformation of the MMM system 100 under increasing compressive displacement, further corroborating the experimental test results shown in FIGS. 4 and 5. The sequence shows the deformation state at 0 mm (an initial state), 2.5 mm, and 5 mm of vertical displacement. At 0 mm, the structure is undeformed. At 2.5 mm of displacement, the simulation shows the vertical compression of the left structure 110 and the right structure 120, accompanied by significant elongation of the horizontal left bar 112 and right bar 122. This illustrates the first stage of energy dissipation in the orthogonal direction D1. At 5 mm of displacement, the deformation of the side structures is more pronounced, and the middle structure 130 is now significantly compressed horizontally. This horizontal compression leads to substantial vertical elongation of the middle bar 132, which is seen stretching in the direction opposite to the applied load. This FEA visualization demonstrates how the specific geometry and material properties cause the structure to first dissipate load orthogonally and then reverse a portion of the load at higher strains.

The MMM system 100 of the present disclosure incorporates a multimaterial construction that combines a first material having relatively rigid characteristics with a second material having relatively elastic characteristics. The arrangement of these materials within the geometric structure of the MMM system 100 enables selective engagement of different components during compression to achieve the desired load dissipation functionality. The MMM system 100 is configured to undergo controlled deformation that converts applied vertical forces into forces acting in perpendicular directions while simultaneously providing resistance in the opposite direction of the applied load. The proposed multimaterial approach of the MMM system 100 allows for progressive engagement of different structural elements as compression increases, providing multiple stages of load dissipation response. Further, the geometric configuration of the MMM system 100 ensures that the elastic and rigid material components interact in a coordinated manner to achieve force redistribution.

The multi-stage load dissipation function of the MMM system 100 offers distinct advantages in applications requiring protection of a subject from impact. When the MMM system 100 is placed between a subject and a compressive load, the initial dissipation of a first portion of the compressive load to an orthogonal direction by the left bar 112 and the right bar 122 effectively reduces the peak force transmitted directly to the subject. Subsequently, the reversal of a second portion of the compressive load in an opposite direction by the middle bar 132 provides a secondary, opposing force that further mitigates the impact. This sequential response could be used in personal protective equipment, such as helmets or body armor, where dissipating an impact away from the body before actively resisting the residual force could reduce injury. Similarly, for the packaging and transport of sensitive electronic or scientific equipment, the MMM system 100 could provide cushioning that not only absorbs shock but actively redirects and counters impact forces.

Furthermore, the mechanical response of the MMM system 100 can be tuned for specific applications by adjusting the dimensions and material properties of its components. The load level at which the middle structure 130 engages and activates the load-reversing middle bar 132 can be predetermined by the geometry of the left structure 110 and the right structure 120. This allows the MMM system 100 to be designed for different impact scenarios, such as low-velocity sustained compression or high-velocity impacts. For example, in automotive applications, the MMM system 100 could be integrated into bumper systems or passenger safety cells, where the MMM system 100 is configured to provide a soft initial response to dissipate low-speed impact energy orthogonally, followed by a stiffening, load-reversing response to manage higher-energy collisions. This provides a method of energy management that is adaptable and goes beyond simple uniform crushing or absorption.

Numerous modifications and variations of the present disclosure are possible in light of the above teachings. It is therefore to be understood that within the scope of the appended claims, the invention may be practiced otherwise than as specifically described herein.

The invention claimed is:

1. A multimaterial mechanical metamaterial (MMM) system, comprising:

a top surface positioned at a top side of the MMM system;

a bottom surface positioned at a bottom side of the MMM system;

a left structure positioned at a left side of the MMM system and comprising four left lateral faces defining a left open-ended prism shape;

a right structure positioned at a right side of the MMM system and comprising four right lateral faces defining a right open-ended prism shape;

a middle structure positioned between the left structure and the right structure and comprising four middle lateral faces defining a middle open-ended prism shape;

a left bar extending between a left edge and a right edge of the left open-ended prism shape of the left structure;

a right bar extending between a left edge and a right edge of the right open-ended prism shape of the right structure; and a middle bar extending between a top edge and a bottom edge of the middle open-ended prism shape of the middle structure, wherein the top surface, the bottom surface, the left structure, the right structure and the middle structure comprise a first material, and the left bar, the right bar and the middle bar comprise a second material that is more elastic than the first material, wherein upon a compressive load on the MMM system, the left bar and the right bar are configured to dissipate a first portion of the compressive load to an orthogonal direction of the compressive load, and the middle bar is configured to reverse a second portion of the compressive load in an opposite direction of the compressive load.

2. The MMM system of claim 1, wherein when no compression or stretching force is applied on the MMM system:

the top surface, the bottom surface, the left bar and the right bar are parallel to one another and perpendicular to the middle bar.

3. The MMM system of claim 2, wherein when no compression or stretching force is applied on the MMM system:

the left structure is in direct contact with the top surface and the bottom surface, the right structure is in direct contact with the top surface and the bottom surface, the middle structure is spaced apart from the top surface and the bottom surface, and the middle structure is in direct contact with the left structure and the right structure.

4. The MMM system of claim 3, wherein when no compression or stretching force is applied on the MMM system, in a cross section perpendicular to both the middle bar and the top surface:

the left structure has a diamond shape, the right structure has a diamond shape, and the middle structure has a square shape.

5. The MMM system of claim 4, wherein when no compression or stretching force is applied on the MMM system, in the cross section:

a top edge of the left structure is in direct contact with a left end of the top surface, a bottom edge of the left structure is in direct contact with a left end of the bottom surface, a top edge of the right structure is in direct contact with a right end of the top surface, a bottom edge of the right structure is in direct contact with a right end of the bottom surface, a left edge of the middle structure is in direct contact with a right edge of the left structure, and a right edge of the middle structure is in direct contact with a left edge of the right structure.

6. The MMM system of claim 5, wherein when no compression or stretching force is applied on the MMM system, in the cross section:

the top edge, the bottom edge, a left edge and the right edge of the left structure and the top edge, the bottom edge, the left edge and a right edge of the right structure comprise fillet ends that are curved.

7. The MMM system of claim 4, wherein when no compression or stretching force is applied on the MMM system, in the cross section:

a top edge of the middle bar is spaced apart from the top surface by a first distance, and a bottom edge of the middle bar is spaced apart from the bottom surface by a second distance that is equal to the first distance.

8. The MMM system of claim 1, wherein:

the first material is polylactic acid (PLA).

9. The MMM system of claim 8, wherein:

the second material is thermoplastic polyurethane (TPU).

10. The MMM system of claim 1, wherein:

the top surface, the bottom surface, the left structure, the right structure and the middle structure together form one monolithic piece.

11. The MMM system of claim 1, wherein:

the top surface, the bottom surface, the left structure, the right structure and the middle structure consist of the first material.

12. The MMM system of claim 1, wherein:

the left bar, the right bar and the middle bar consist of the second material.

13. The MMM system of claim 1, wherein when a compression force is applied on the MMM system along a first direction perpendicular to the top surface, the left structure compresses along the first direction and extends along a second direction that is perpendicular to the first direction and parallel to the top surface, the right structure compresses along the first direction and extends along the second direction, and the middle structure compresses along the second direction and extends along the first direction.

14. The MMM system of claim 13, wherein when the compression force is applied on the MMM system along the first direction, the left bar and the right bar both extend along the second direction, and the middle bar extends along the first direction.

15. The MMM system of claim 14, wherein when the compression force is applied on the MMM system along the first direction, the left bar and the right bar both extend along the second direction to convert a first portion of the compression force along the first direction to an orthogonal force in the second direction, and the middle bar extends along the first direction to reverse a second portion of the compression force in an opposite direction relative to the first direction.

16. The MMM system of claim 1, wherein:

the top surface, the bottom surface, the left structure, the right structure and the middle structure are equally thick and have a first thickness.

17. The MMM system of claim 16, wherein:

the left bar, the right bar and the middle bar are equally thick and have a second thickness.

18. The MMM system of claim 17, wherein:

the first thickness is larger than the second thickness.

19. A method of multi-directional load dissipation, comprising:

placing the MMM system of claim 1 between a subject and the compressive load.

20. The method of claim 19, further comprising:

orienting the MMM system so that the compressive load is perpendicular to the top surface of the MMM system.

* * * * *